Patented Aug. 9, 1932

1,870,930

UNITED STATES PATENT OFFICE

EDUARD WILHELM SPRÖNGERTS, DECEASED, LATE OF WIESBADEN-BIEBRICH, GERMANY, BY JOHANNA SPRÖNGERTS, ADMINISTRATRIX, OF WIESBADEN-BIEBRICH, GERMANY, AND ROBERT FRANKE, OF WIESBADEN-BIEBRICH, GERMANY, ASSIGNORS TO KALLE & CO. AKTIENGESELLSCHAFT, OF WIESBADEN-BIEBRICH, GERMANY, A CORPORATION OF GERMANY

LIGHT-SENSITIVE LAYER

No Drawing. Application filed December 23, 1930, Serial No. 504,418, and in Germany January 22, 1930.

The present invention relates to light-sensitive layers.

It is known that diazo compounds are sensitive to light and are suitable for the preparation of light-sensitive layers.

Among the large number of diazo compounds the oxydiazo compounds and the aminodiazo compounds have proved to be particularly suitable for this purpose. The oxydiazo compounds are distinguished by a very good stability. The aminodiazo compounds have the advantage of easily giving dark tones. The colour tones of the dyestuffs may be modified by substitution of the aromatic nucleus and the amino group. Alkyl-, aralkyl- and aryl groups have hitherto been proposed as substitutents of the amino group. There are, however, amongst the large number of aminodiazo compounds only a few which are suitable for the preparation of diazo-types by a dry as well as by a wet process. Diazo compounds, when applied on a base together with an azo component, can generally be developed in a satisfactory manner only in a dry way, for instance, by means of ammonia gas, but difficultly in a wet way, because the dyestuff lines easily run during the development. For the wet process are, therefore, most suitable, layers which only contain the diazo compound, preferably one having a strong coupling power. But those layers have, on the other hand, the disadvantage, that they must be developed with alkaline solutions of azo components, which solutions are, as is known, hardly stable.

Now we have found that diazo compounds from aromatic diamines, of the following general formula

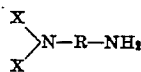

wherein R stands for an aromatic residue which may be substituted and X for hydrogen, alkyl, aryl, aralkyl or a hydrogenated aromatic residue, but at least one of the X's for a hydrogenated aromatic residue, such as cyclohexylaminoaniline, are particularly suitable for diazo type processes, because layers can be prepared which can be developed in a wet as well as in a dry manner. The diazo compounds are suitable for layers containing the diazo component alone, but also for those containing the diazo component together with an azo component. The diazo compounds may contain in the nucleus and in the amino group, besides the hydrogenated aromatic residue, also further groups or substituents, for instance, alkyl groups.

The diazo compounds can also advantageously be utilized in the dyestuff industry, for instance, for the preparation of basic azo dyestuffs.

The following examples serve to illustrate the invention, but they are not intended to limit it thereto; the parts are by weight unless otherwise stated.

1

20 parts of para-chlorobenzene-sulfonate of 4-diazo-1-cyclohexylaniline,
1.3 parts of phloroglucine,
0.6 parts of resorcin,
60 parts of tartaric acid,
40 parts of boric acid,
40 parts of thio-urea,
20 parts of the sodium salt of the naphthalene-1.3.6-trisulfonic acid, and
30 parts of aluminium sulfate are dissolved in 1000 parts by volume of water and the solution is applied on a base, such as paper, film, tissue, or the base is impregnated with the solution in the usual manner. After exposure to light under a picture, design or other representation to be copied the print or the like may either be developed with ammonia gas, whereupon deep dark brown lines of excellent fastness to light and water are obtained on a white ground, or it may be developed by applying an alkaline liquid by means of a sponge or a machine in which case dark blue lines are obtained. A sodium carbonate solution of 10% strength will, for instance, suffice for the development of the pictures. For the purpose of stabilizing the pictures and the ground, agents may be added to the developing solution which prevent the ground from turning yellow, for instance, sodium thiosulfate. In order to modify the tone, if desired, further azo components may also be added.

2

30 parts of the sodium salt of the naphthalene-1.3.6-cyclohexylaniline.
10 parts of oxalic acid or adipic acid,
40 parts of thio-urea,
30 parts of the sodium salt of the naphthalene-1.3.6-trisulfonic acid, and
20 parts of ammonium sulfate are dissolved in 1000 parts by volume of water and the solution is applied on paper in the usual manner. The copies may, after exposure to light, be developed with alkaline solutions of the most diverse coupling components, for instance, phenols, meta-aminophenols, aminophenols or the acyl derivatives thereof. For instance, deep blue pictures are thus obtained with an alkaline phloroglucine solution, to which, if necessary, a wetting agent, such as saponine, has been added. Instead of the 4-diazo-1-cyclohexylaniline there may also be used the 4-diazo-1-dicyclohexylaniline.

3

1.8 parts of phloroglucine,
25 parts of para-chlorobenzene-sulfonate of 4-diazo-2-methoxy-1-cyclohexylaminobenzene, obtainable according to the usual methods,
50 parts of maleic acid,
30 parts of aluminium sulfate,
15 parts of ammonium sulfate,
50 parts of thio-urea, and
30 parts of the sodium salt of the naphthalene-1.3.6-trisulfonic acid are dissolved in 1000 parts by volume of water and the solution is applied on paper as above indicated. A very light-sensitive paper is obtained. It may be developed in dry manner, for instance, by means of ammonia gas, or an alkaline powder, or in a wet manner, for instance, by means of solutions of sodium-carbonate, triethanolamine, sodium bicarbonate or borax. The color tones are somewhat more reddish than with the nonsubstituted diazo compound of Example 1.

4

When using instead of the diazo compound of the preceding example the para-chlorobenzene-sulfonate of the 4-diazo-3-methyl-1-cyclohexylaminobenzene, which can be prepared by coupling 3-methylcyclohexylaniline with diazotized para-aminobenzenesulfonic acid, subsequently splitting the azo dyestuffs produced and diazotizing the 4-amino-3-methyl-1-cyclohexylaniline formed, a paper is obtained which yields similar tones as in Example 3, but which is distinguished by an excellent stability when developed in a dry or wet manner.

5

22 parts of the tin chloride double salt of 4-diazo-N-methylcyclohexylaminobenzene,
0.6 parts of resorcin,
50 parts of tartaric acid or lactic acid or another organic acid,
40 parts of boric acid,
30 parts of the sodium salt of the naphthalene-1.3.6-trisulfonic acid,
50 parts of thio-urea, and
1.2 parts of phloroglucine are dissolved in 1000 parts by volume of water and the solution is applied on a base as above indicated. The dyestuff components can, of course, also be successively applied on the paper. This paper which can be well stored and is excellently sensitive to light, yields with ammonia gas or sodium carbonate solution or another alkali, black copies of good fastness to ink, i. e., lines drawn thereon with ink do not run. Similar results are obtained with the corresponding ethyl compound, the 4-diazo-N-ethyl-1-cyclohexylaminobenzene or the corresponding N-phenyl and N benzyl compounds.

6

22 parts of the tin chloride double salt of 4-diazo-N-ethyl-1-cyclohexylaminobenzene,
30 parts of citric acid,
20 parts of the sodium salt of the naphthalene-1.3.6-trisulfonic acid,
20 parts of aluminium sulfate, and
50 parts of thio-urea are dissolved in 1000 parts by volume of water and the solution is applied on paper which is developed with an alkaline solution of coupling components, for instance resorcin, 4.6 dichloro-resorcin, dioxynaphthalenes, hydrogenated naphthols, etc. The diazo compound combines with the azo component to form an azo dyestuff without the lines of the print running. By means of an alkaline phloroglucine solution, for instance, a deep black is obtained on a white ground. Similar results are obtained with the corresponding 3- and 2-diazo compounds.

7

2.2 parts of the tin chloride double salt of the diazo compound of para-aminocyclohexylbenzylaniline are dissolved with 2 parts of tartaric acid, 2 parts of boric acid and 5 parts of thio-urea in 100 parts by volume of water.

This solution is applied on paper. It is then dried at a low temperature.

Paper strips, impregnated with this solution, are eposed to light under a picture, design or other representation which is to be copied, and are developed by applying a solution of 30 parts of sodium thiosulfate,
7 parts of sodium carbonate,
5 parts of sodium chloride,
2 parts of ammonium sulfate, and
0.12 parts of phloroglucine in 100 parts of water.

Copies with deep black lines are obtained.

The benzene-nucleus may be substituted by various other substituents such as carboxyl-groups, halogens, nitro groups, etc.

Instead of the benzyl residue there may also stand the naphthalene residue.

We claim:

1. As new products, light-sensitive layers containing diazo compounds of amino compounds of the following formula

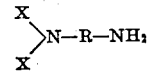

wherein R stands for an aromatic residue which may be substituted, and X for hydrogen, alkyl, aryl, aralkyl or a hydrogenated aromatic residue, but at least one X for a hydrogenated aromatic residue.

2. As new products, light sensitive layers containing diazo compounds of amino compounds of the following formula

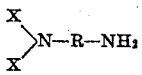

wherein R stands for a benzene nucleus which may be substituted, one X for a hydrogenated aromatic residue and the other X for hydrogen, alkyl, aryl or aralkyl.

3. As new products, light sensitive layers containing diazo compounds of amino compounds of the following formula

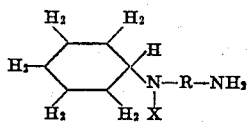

wherein R stands for a benzene-nucleus which may be substituted and X for hydrogen, alkyl, aryl or aralkyl.

4. As new products, light sensitive layers containing diazo compounds of amino compounds of the following formula

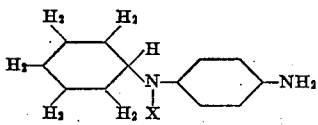

wherein X stands for hydrogen, alkyl, aryl or aralkyl.

5. As new products, light sensitive layers containing diazo compounds of amino compounds of the following formula

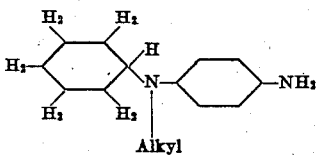

6. As new products, light sensitive layers containing diazo compounds of amino compounds of the following formula

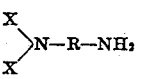

wherein R stands for an aromatic residue which may be substituted, and X for hydrogen, alkyl, aryl, aralkyl or a hydrogenated aromatic residue, but at least one X for a hydrogenated aromatic residue, together with an azo component.

7. As new products, light sensitive layers containing diazo compounds of amino compounds of the following formula

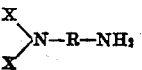

wherein R stands for a benzene-nucleus which may be substituted, one X for a hydrogenated aromatic residue and the other X for hydrogen, alkyl, aryl or aralkyl, together with an azo component.

8. As new products, light-sensitive layers containing diazo compounds of amino compounds of the following formula

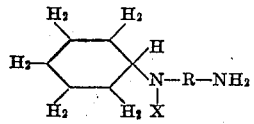

wherein R stands for a benzene-nucleus which may be substituted and X for hydrogen, alkyl, aryl or aralykl, together with an azo component.

9. As new products, light sensitive layers containing diazo compounds of amino compounds of the following formula

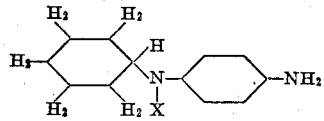

wherein X stands for hydrogen, alkyl, aryl or aralkyl, together with an azo component.

10. As new products, light sensitive layers containing diazo compounds of amino compounds of the following formula

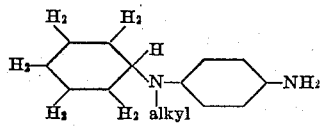

together with an azo component.

11. As new products, light sensitive layers containing diazo compounds of amino compounds of the following formula

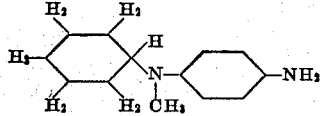

together with an azo component.

12. As new products, light sensitive layers containing diazo compounds of an amino compound of the following formula

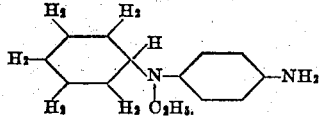

In testimony whereof, we affix our signatures.

JOHANNA SPRÖNGERTS,
*Administratrix of Eduard Wilhelm Spröngerts, Deceased.*
ROBERT FRANKE.